Dec. 14, 1965        J. M. HOLAHAN        3,223,349
DRAG MECHANISM FOR A SPINNING REEL
Filed Oct. 25, 1962        2 Sheets-Sheet 1
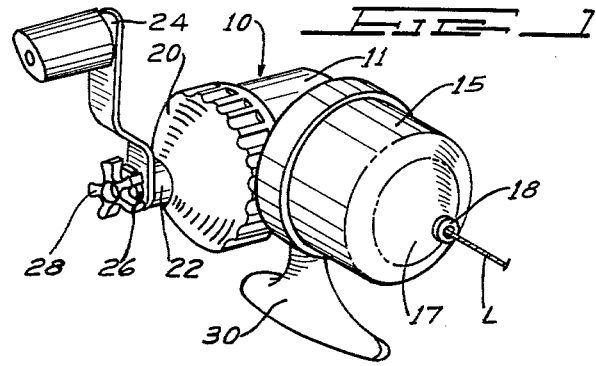
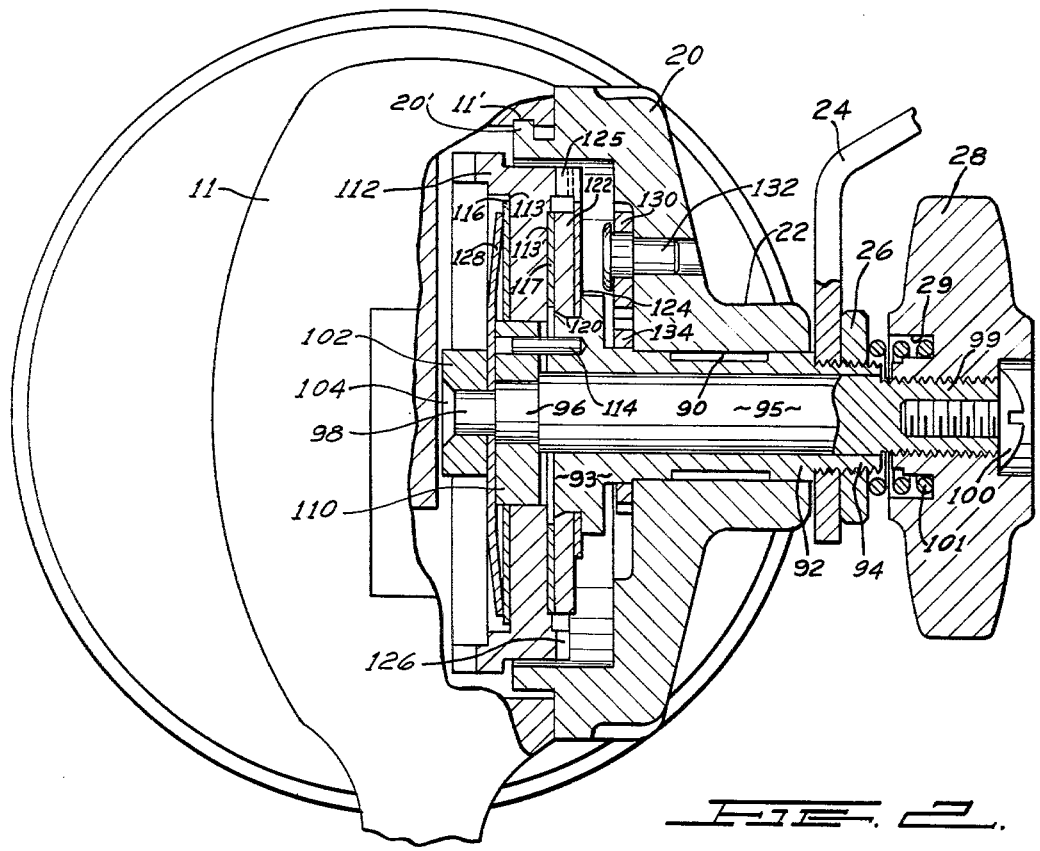
INVENTOR.
Joseph M. Holahan
BY
ATTORNEYS

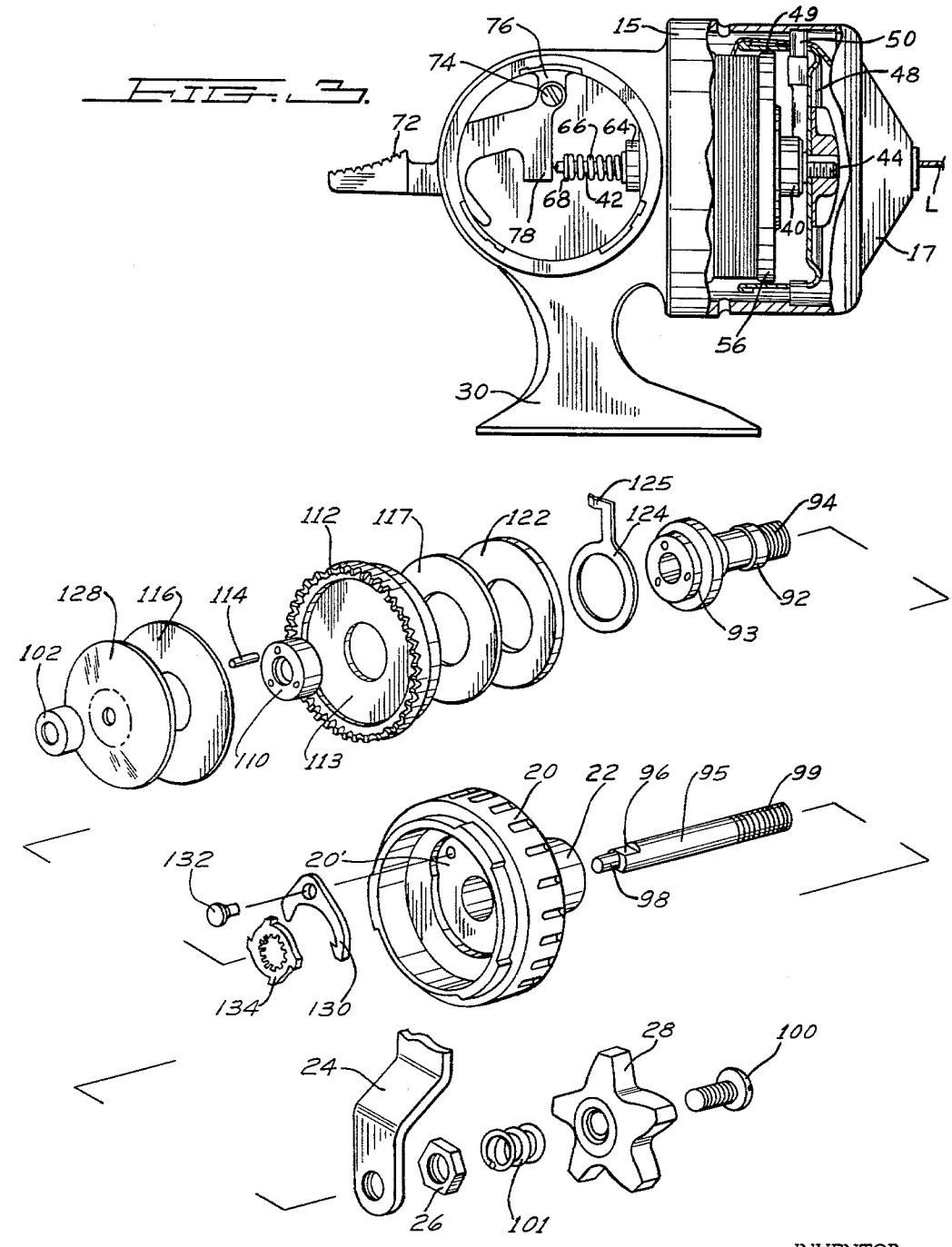

United States Patent Office 3,223,349
Patented Dec. 14, 1965

3,223,349
DRAG MECHANISM FOR A SPINNING REEL
Joseph M. Holahan, Geneva, Ohio, assignor to True Temper Corporation, Cleveland, Ohio, a corporation of Ohio
Filed Oct. 25, 1962, Ser. No. 233,001
2 Claims. (Cl. 242—84.45)

This invention relates to fishing reels of the spinning type and more particularly to new and improved drag means for use therewith.

An object of the present invention is to provide a drag system that is conveniently positioned adjacent the crank or handle whereby the drag can be adjusted without the operator having to remove his hand from the handle.

A further object of my invention is to uniformly distribute the drag pressure over substantially the entire surfaces of the drag washers and adjacent drag components thereby minimizing excessive heating and prolonging the life of the drag washers.

Yet another object of my invention is to prevent seizing of the drag components at peak pressures by providing a relatively large contact surface area between the drag washers and the drag components positioned adjacent thereto.

Still another object of my invention is to provide a smooth and gradual drag adjustment.

A further object of my invention is to achieve an absorption of the torque resulting from the drag pressures over a relatively extended area.

Another object is to provide a drag mechanism that is composed of but few parts and can be easily incorporated into existing reels and can be assembled and disassembled with relative ease.

These and other objects of my invention will become more readily apparent from the ensuing specification and the accompanying figures of drawing, in which:

FIG. 1 is a perspective view of a spinning reel having associated therewith the novel drag system of my invention;

FIG. 2 is a vertical sectional view of a portion of the reel of FIG. 1, showing more clearly, and in enlarged form, the drag components of my novel drag assembly;

FIG. 3 is a vertical sectional view of a portion of the reel of FIG. 1, showing the line winding structure of the spinning reel which has associated therewith the novel drag assembly of my invention;

FIG. 4 is an exploded view showing the drag components and their associated parts.

Referring now to the drawings, wherein like reference characters are used to designate like parts, a spinning reel, incorporating the drag assembly of my invention, is generally indicated at 10 and comprises a hollow cup-shaped gear housing 11 and a shroud spool enclosing member 15 secured to the forward end thereof. The shroud member, as illustrated, is provided with a centrally disposed aperture having an eyelet 18 therein through which the line L passes during casting or rewinding. The gear housing 11 is provided with a side or cover plate 20 which combines with the housing 11 to define an opening for housing, interalia, the drag assembly forming my invention. The laterally disposed cover plate 20 has a central, outwardly extending bored hub portion 22 through which a drag shaft 95 is disposed and a crank sleeve 92 is disposed, a crank handle 24 being secured by a nut 26 to the sleeve 92, and a drag knob 28 serving as an adjusting member to vary the drag being secured to the drag shaft 95 by means of a screw 100. Depending from the gear housing 11 and preferably formed integrally therewith is a reel seat base member 30, said base member illustrated being of a conventional nature and adapted to be seated in reel base seating means (not illustrated) associated with a fishing rod.

As best shown in FIG. 3, the gear housing 11 has a substantially circular partition wall and a longitudinally and forwardly extending cylindrical journal 40 preferably integrally formed therewith. The cylindrical or journal portion 40 is provided with an opening substantially centrally thereof through which a plunger shaft 42 is mounted for axial and rotative movement. The plunger shaft 42, as shown, is preferably provided with a threaded portion 44 at one end thereof and said portion 44 preferably is provivded with a flat upper surface whereby a winding drum 48 having an opening in the central portion thereof corresponding in shape to the flatted end portion 44 of the shaft 42 may be non-rotatably mounted thereon. A line pick-up means generally indicated at 50 is, in the form shown, preferably mounted on the winding cup 48 and is adapted to be positioned in a line-engaging position, as shown in FIG. 2, or in line reelasing position (not shown), wherein the outermost end of the pick-up pin 52 is withdrawn to a position inwardly of the rearwardly extending flange 49 of the winding cup 48. The specific structure of the line pick-up means 40 does not form a part of the instant invention.

A line spool 56, as shown, is mounted on the cylindrical portion 40 of the housing 11 and said spool is of such a diameter that a rearwardly extending peripheral flange 49 of the winding drum 48 overhangs in spaced relation the exterior peripheral flange of the spool and is free to reciprocate forwardly or rearwardly with respect thereto.

As illustrated, the spur gear is non-rotatably mounted on a preferably flatted rear portion of the plunger shaft 42, whereby rotation of said spur gear 64 will correspondingly rotate said shaft 42 and said spur gear 64 meshes with a bevel gear 112 secured by a gear bushing 110 to the crank shaft 92 and is driven thereby. A coil spring 66 surrounds the plunger shaft 42 and the front end of said spring abuts the gear 64 while the rear end of said spring abuts a retaining clip 68 seated within a groove formed in the rear end of said shaft 42. A pushbutton or thumb lever for pushing the shaft 42 forwardly against the action of the spring is generally indicated at 72 and is pivoted at 74 in the gear housing 11 to a bracket member 76 preferably formed integrally in the housing 11. The thumb lever 72, as illustrated, is provided with a lower inner end portion 78 abutting the rear end of the shaft 42. It should thus be apparent that when thumb lever 72 is depressed and moved downwardly, as viewed in FIG. 2, the lever pivots about its pivotal connection 74 whereby the inner end thereof, 78, moves forwardly causing the plunger shaft 42 to move forwardly, or to the right, as viewed in FIG. 2 against the action of the spring 66. Such forward movement of the shaft 42 causes in turn the winding drum 48 and the pick-up means generally indicated at 50 to be moved forwardly. Release of the thumb lever causes the spring 66 to move the shaft 42 and winding drum rearwardly.

Referring now more particularly to FIG. 2 wherein the novel drag device of my invention is illustrated in an enlarged view, the hub of said side cover plate 20 has longitudinally disposed bore 90 therethrough. As described above, a crank sleeve 92 is disposed within said bore 90 and the forward or inner end of said sleeve is provided with a relatively large diameter portion 93 and the rear or outer end of said sleeve is provided with an externally threaded end portion 94. A crank handle 24 is mounted on the externally threaded end portion 94 of the crank sleeve 92 and retained thereon by means of a threaded nut 26. The drag shaft 95 is disposed through a centrally disposed longitudinally extending bore in the crank sleeve 92 and said drag shaft is provided at a forward or inner end portion thereof with a flatted section 96 and a reduced diameter shaft section 98, and at its rearmost or externally disposed end thereof with a threaded end portion 99. A drag knob 28 is disposed in threaded engagement over the outer threaded end 99 of the drag shaft 95 by means of screw means 100. The drag knob 28 illustrated is provided further with an annular recess portion 29 adapted to seat an end of a coil compression spring 101, the other end of said spring abutting the nut 26 securing the crank 24. The function of the said spring 101 will be more specifically discussed hereinbelow.

The side cover plate 20 illustrated may be releasably secured to the rear housing 11 in any suitable manner, there being preferably employed in the form shown a bayonet slot arrangement having a plurality of laterally offset upwardly extending flange portions 20′, which, in the form shown, preferably three, are adapted to be seated in correspondingly shaped openings 11′, formed in the rear housing member 11. The said bayonet slot arrangement is conventional in nature and forms no part of the instant invention; it being well understood that any other suitable means could be employed for releasably mounting the side cover plate 17 onto the rear housing 11.

It will be noted that a spacer element 102, as illustrated, is mounted on the forwardmost, reduced diameter portion 98 of the drag shaft 95 and is secured to the reduced portion 98 of said shaft 95 by rivet means 104.

Non-rotatably mounted upon the adjacent flatted portion 96 of the drag shaft 95 is a gear bushing 110. The said bushing 110 is non-rotatably mounted on the drag shaft 95 and serves as a mounting means for a main bevel driving gear 112 loosely mounted thereon. As described hereinbefore, the said main driving gear 112 is in meshed engagement with the pinion gear 64 previously described whereby rotation of the gear 112 is transferred through the gear means 64 to the winding drum 48. In the form of my invention illustrated herein, rotary movement from the handle is transferred by means of the crank sleeve 92 to the gear bushing 110 through a plurality of drive pins 114, one of which is shown in FIG. 3; said pins extending through aligned openings provided in the crank sleeve 92 and the gear bushing 110. It will thus be noted that due to the non-rotatable mounting of the gear bushing 110 on the flattened portion 96 of the drag shaft 95, rotation of the crank handle 19 causes rotation of gear sleeve 92 which in turn, through the coupling arrangement provided by pins 114, causes the gear bushing 110 and the drag shaft 95 to correspondingly rotate.

As shown, a centrally apertured annular friction washer 116 is provided on one side of the main driving gear 112 and a similar annular friction washer 117 is disposed on the opposite side of said gear, and said washers are in face-to-face engagement with the face 113 of the body of the gear 112. The washer 116 is positioned over the gear bushing 110 and is preferably of substantially equal dimension with the forward, vertically extending base 113 of the main driving gear 112. The friction washer 117 mounted on the rearwardly or exteriorly extending side of the main driving gear 112 is adapted to be seated in a correspondingly shaped annular groove 113′ provided in the rear face of the base of the main driving gear 112.

The innermost relatively enlarged diameter portion 93 of the crank sleeve 92, as shown, is provided in the extreme forward portion thereof with an annular groove 120, said groove being adapted to seat an apertured gear plate 122 and a click spring 124. The gear plate 122 and click spring 124 are preferably fixedly secured to the crank sleeve by means of swaging or the like, whereby the crank sleeve 92, gear plate 122 and spring 124 act in a unitary manner. It will be noted that the friction washer 117 is thus interposed face-to-face between the gear plate 122 and the main driving gear 112. As will be more specifically pointed out hereinbelow, the gear plate 122 affords a stationary surface against which the drag elements react with varying degrees of pressure, whereby the drag on the fishing line can be varied and the torque absorbed by said gear plate and the stationary cover plate. It will be noted that the torque or pressure is absorbed over a significantly large area.

Mounted on the reduced diameter portion 98 of the shaft 95 is a drag spring washer 128, said drag spring washer being interposed between the spacer 102 and the gear bushing 110. As will be noted, the drag spring washer 128 is curved or dish-shaped whereby the area of contact between the inner surface of the drag spring washer 128 and the outer surface of the friction washer 116 can be varied, the pressure being applied to the outer peripheral surfaces first and gradually to the more centrally disposed portions thereof.

The click spring 124 has an upwardly and inwardly directed flange 125 which is adapted to extend into contact with a plurality of circumferentially disposed teeth 126 provided on the rear face of the main driving gear 112. When there is relative rotation between the main driving gear 112 and the crank sleeve 92, the teeth 126 will move relative to the flange 125, or vice versa, whereby an audible "clicking" sound will give notice to the operator that the slippage is present. It will be understood that the click spring 124 will be of such size and resiliency that rotation of the main driving gear 112 relative to the gear sleeve 92, or vice versa, will not be retarded when there is relative rotation therebetween.

A pawl 130 is secured to the inner recessed face 20′ of the side cover plate 20 by means of a pawl pivot pin 132 and said pawl is of a conventional nature and adapted to contact ratchet means 134 carried by the crank sleeve 92 and rotatable therewith, said ratchet being spaced outwardly of the enlarged portion 93 of the sleeve. In a conventional manner, the ratchet and pawl arrangement insures that the rotating crank or handle 19 and all parts connectably secured thereto can be rotated in but one direction, whereby withdrawal of the line from the reel during non-rotation of the rotating crank or handle 19 is controlled completely through the drag mechanism.

Referring now to FIG. 4, the drag members and components forming the drive mechanism are shown in exploded view to more clearly illustrate the structure thereof. It should be noted that, for purposes of illustration, the gear plate 122 and click spring 124 are shown separated from the crank sleeve 92 and that only one pin 114 is shown, it being understood, however, as set forth above, that three such pins are preferably employed.

As described, manual rotation of the handle 19 causes rotation of the crank sleeve 92 and the main driving gear 112 is driven through a frictional drive assembly comprising drag spring 128 and frictional washers 116 and 117. Thus, the main driving gear 112 can be caused to rotate relative to the crank sleeve 92, or vice versa, or can be made to rotate therewith. The frictional pressure between the main driving gear 112 and the crank sleeve 92, through friction washer 117 and gear plate 122, can be made minimal by merely rotating the drag knob 28 in a counterclockwise direction. Rotation of the drag knob 28 in such direction causes the drag shaft 95 to move forwardly or to the left, as viewed in FIG. 2; the forward movement of the shaft 95 causing the drag spring washer 128 to similarly move forward, thereby causing a decrease in the pressure between the main driving gear 112 and the crank sleeve 92 resulting from a lessening of pressure exerted by the spring 128. Specifically, such forward movement of shaft 95 causes decompression of the drag spring washer 128, whereby the pressure of the drag spring washer 128 against friction washer 116, the main driving gear 112, the friction washer 117 and the gear plate 122 is decreased. With the release of such spring pressure the main driving gear 112 is adapted to rotate relative to the crank sleeve 92 or vice versa. Relative rotation between the main driving gear and the crank sleeve 92 might exist or be desirable; for example, when a fish has struck the line L and is carrying the same outwardly. It will be understood that any heat created by rotation of the main driving gear 112 relative to the stationary crank sleeve 92 is absorbed by the drag mechanism, namely, the friction washers 116 and 117 and the drag members associated therewith.

Where it is desired to increase the drag and thereby control or restrain the outflow of the fishing line L, the drag knob 28 is rotated in a clockwise direction. Such rotation causes the drag shaft 95 to be moved rearwardly, or to the right, as viewed in FIG. 2. As a shaft 95 moves rearwardly, the spacer member 102 compresses and flattens the drag spring washer 128 increasing the pressure thereof against the members positioned rearwardly thereof, namely, the friction washers 116 and 117 and the gear 112, all of which move rearwardly. The pressure is thereby increased between the axially stationary gear plate 122 and the main driving gear 112, through friction washer 117 interposed therebetween. Continued rotation of the drag knob 28 causes the contact pressure between the main driving gear 112, the friction washer 117 and the gear plate 122 to attain a point where the gear 112 is effectively frictionally coupled to the gear plate 122, and relative rotation between said members ceases. When such frictional contact pressure is reached, it will be understood that the fishing line L cannot be withdrawn from the spinning real. As will be understood, when the drag pressure is varied between minimum and maximum, the line is retarded but not prevented from flowing outwardly of the reel.

Particular attention should be given to the manner in which the drag is effected by the instant invention. In prior art drag arrangements with which this applicant is familiar, the rotation of a drag knob or similar motion transferring mechanism has caused the drag components positioned between the drag knob and a stationary member to be compressed, whereby the drag can be increased. This arrangement has been found to some extent satisfactory in larger size reels where there is sufficient space to accommodate a relatively large stationary member which serves to provide a surface against which the drag washers can be compressed. The provision of a separate stationary member is, however, clearly undesirable where small spinning reels are employed and wherein space is of prime consideration. The drag system of the present invention comprises a very effective drag which can be accomplished by utilizing a minimum of component parts and wherein the main gear and the cover plate for the gear affords a relatively large stationary member against which torque is exerted. To effect an increase in the drag, rotation of the drag knob 28 causes the drag shaft 95 to move rearwardly, or to the right, as viewed in FIG. 2, whereby the drag components are likewise moved rearwardly and compressed; the friction washer 116 being compressed between drag spring 128 and gear 112, and friction washer 117 being compressed between gear 112 and the gear plate 122.

It will further be noted that the main driving gear 112, being loosely mounted on the gear bushing 110, moves forwardly or rearwardly, depending on whether the drag pressure is being decreased or increased, respectively. The rearward movement of the main driving gear 112, however, is not sufficient to cause the main driving gear to become disengaged from the bevel pinion 64 which rotates the winding drum 48. If desired, the rearward movement of gear 112 can be limited by employing a relatively non-compressive friction washer 117.

The manner in which the coil spring 101, mounted partially within the drag knob 28, cooperates with the drag spring washer 128 to effect the drag should also be noted. As the drag knob 28 is rotated clockwise, the spring 101 is compressed against the rear face of the lock nut 26 since the latter is stationarily mounted outwardly of the crank 24 and cannot move inwardly when the drag knob 28 is rotated clockwise. As the pressure from the compression of the coil spring 101 increases, such pressure will tend to maintain a spaced relationship between the forward face of the drag knob 28 and the rear face of the lock nut 26. When this condition exists, continued clockwise movement of the drag knob 28 results in rearward movement of the shaft 95 and effects the drag.

In a similar manner, the counter-clockwise rotation of the drag knob 28 and the corresponding decrease in compression of the coil spring 101 causes a relative movement between the drag knob 22 and the drag shaft 95, which varies depending on the spring pressure. By employing the coil spring 101 in conjunction with the drag spring washer 128, a drag is provided which is exceptionally smooth and wherein the degree of adjustment is very gradual. The smooth, gradual drag prolongs the life of the drag washers and prevents seizing of the drag components at points of highest pressure.

Still another advantage of my instant drag assembly should be noted. By employing a relatively large, curved drag spring, a relatively large friction area is provided, which area increases as the drag is increased, thereby increasing the area of pressure between the friction washer 116 and the driving gear 112. The drag pressures are thus evenly distributed over a large area thereby prolonging the life of the friction washers and increasing their effectiveness under high pressure conditions. Also, by applying pressure through the drag spring 128, primarily to that portion of the friction washer 116 which is relatively adjacent the outer periphery thereof, the pressure at the center of the friction washer is greatly reduced. Hence, the relatively high pressures existing at the center area of friction washers in the prior art drag mechanisms have thus been eliminated, which resulted in deleterious wear of the friction washers in such prior art drag mechanisms. The effective radius at which the frictional load is applied is, it will be understood, increased in the present structure.

It will be understood, particularly by those skilled in the art to which this invention appertains, that various changes can be made from the embodiment described herein without, however, departing from the spirit of my invention and the scope of the appended claims.

What I claim is:

1. A spinning type casting reel comprising a gear housing and a spool enclosing housing, said spool enclosing housing secured to said gear housing, a laterally disposed cover plate for said gear housing, a longitudinally extending bore in said cover plate, a crank sleeve disposed through said bore, a drag shaft disposed through said crank sleeve and rotatable therewith, a manually operable crank means disposed at one end of said crank sleeve, a main driving gear adapted to rotate relative to said crank sleeve, a manually operable drag adjustment means disposed at one end of said drag shaft and outwardly of said manually operable crank means, an annular spring member generally dish-shaped disposed at an opposite end of said drag shaft and adapted to exert spring pressure against said gear, spring means associated with said manually operable drag adjustment means adapted to exert pressure against said drag adjustment means during rotative movement thereof, the outward movement of said drag shaft by further rotative movement of said drag adjustment means gradually increasing frictional contact between the annular spring, said main driving gear and said crank sleeve, the pressure caused by relative rotation of the gear and crank sleeve being absorbed by said cover plate and gear housing.

2. A drag assembly for fishing reels comprising a gear case housing, a main driving gear disposed therein, a crank sleeve, a drag shaft, said crank sleeve and drag shaft disposed through said housing, crank means for rotating said crank sleeve and said drag shaft relative to said housing, an annular dish-shaped spring member carried at one end of said drag shaft, drag washer means associated with said gear and interposed between said spring member and said crank sleeve, a drag knob disposed for rotation at the opposite end of said drag shaft, a second spring member associated with said drag knob and exerting an outward pressure on said drag knob, said drag knob when rotated increases the said second spring pressure until a predetermined drag is reached, continued movement then being adapted to longitudinally move said drag shaft outwardly of the housing against the pressure exerted by said second spring member to cause gradual increase of pressure by the said first recited spring member whereby frictional coupling of the said gear and said crank sleeve is caused through pressure exerted on said interposed drag washer means.

References Cited by the Examiner
UNITED STATES PATENTS

| | | | |
|---|---|---|---|
| 2,197,779 | 4/1940 | Coxe | 242—84.44 |
| 2,773,655 | 12/1956 | Mandolf | 242—84.21 |
| 2,777,645 | 1/1957 | Wood | 242—84.21 |
| 3,025,020 | 3/1962 | Sarah | 242—84.45 |
| 3,085,766 | 4/1963 | Salmivuori | 242—84.45 X |

FOREIGN PATENTS

| | | |
|---|---|---|
| 930,541 | 8/1947 | France. |
| 1,184,698 | 2/1959 | France. |

MERVIN STEIN, *Primary Examiner.*

RUSSELL C. MADER, *Examiner.*